United States Patent [19]

Baines

[11] Patent Number: 4,855,632

[45] Date of Patent: Aug. 8, 1989

[54] ASSEMBLED COMMUTATORS

[75] Inventor: Roger F. Baines, Repulse Bay, Hong Kong

[73] Assignee: Johnson Electric Industrial Manufactory, Ltd., Chaiwan, Hong Kong

[21] Appl. No.: 46,123

[22] Filed: May 5, 1987

[30] Foreign Application Priority Data

May 8, 1986 [GB] United Kingdom ............... 8611207

[51] Int. Cl.$^4$ ........................................... H02K 13/00
[52] U.S. Cl. ..................................... 310/233; 310/42; 310/234
[58] Field of Search ............... 310/233, 234, 235, 236, 310/237, 42, 40 MM, 154, 177, 248, 219, 232

[56] References Cited

U.S. PATENT DOCUMENTS

| Re. 17,801 | 9/1930 | Bonsieur | 310/235 |
| 2,658,158 | 11/1953 | Bender, Jr. | 310/234 |
| 3,165,654 | 1/1965 | Mabuchi | 310/154 |
| 3,445,692 | 6/1969 | Kato | 310/154 |
| 4,152,614 | 5/1979 | Noguchi | 310/233 |
| 4,322,650 | 3/1982 | Mabuchi | 310/233 |
| 4,335,323 | 6/1982 | Kebbon | 310/154 |
| 4,521,710 | 6/1985 | Mabuchi | 310/234 |

FOREIGN PATENT DOCUMENTS

| 0090685 | 10/1983 | European Pat. Off. | |
| 1224823 | 9/1966 | Fed. Rep. of Germany | 310/235 |
| 0231684 | 1/1986 | German Democratic Rep. | 310/233 |
| 659744 | 10/1951 | United Kingdom . | |
| 2005927 | 4/1979 | United Kingdom . | |
| 2060274 | 4/1981 | United Kingdom | 310/233 |

OTHER PUBLICATIONS

Johnson HC315MSG; 2/86; Johnson Electric Industrial Mfty Ltd.; HC313G/HC315G; HC355; HC310G.

Primary Examiner—R. Skudy
Attorney, Agent, or Firm—Fleit, Jacobson, Cohn, Price, Holman & Stern

[57] ABSTRACT

An assembled commutator for use in a fractional horsepower electric motor comprises a base moulded from thermoplastics and a commutator segment mounted on the base. The segment has a tang for electrical connection to an armature coil, the tang comprising a first radially extending portion and second portion connected to the first portion along a fold line.

Wire of the coil is passed may be welded or forged to the tang by pressing together the first and second portions, and heating them electrically.

10 Claims, 2 Drawing Sheets

ASSEMBLED COMMUTATORS

INTRODUCTION

The present invention relates to assembled commutators, and in particular to an improved commutator and method for the attachment of an armature coil winding to a commutator. The invention is particularly applicable to fractional horsepower PMDC motors.

BACKGROUND

It is desirable to manufacture commutators by injection moulding a base from plastics material and assembling copper segments onto the base and securing them to the base by some means. This method of manufacturing allows the production of a very low cost commutator.

In previous designs the tangs of the copper commutator segments have been designed so that wire is hooked into them and then a welding tool is brought down on the tangs from above causing heat and pressure to be distributed on the commutator body.

A major disadvantage of such a commutator has been that the winding wire cannot be readily welded or hot staked to tangs of the commutator segment because the heat and pressure required to make a good joint has caused distortion of the low temperature-softening moulding material which makes up the base.

As a result it has been preferable to use low temperature wire grades which can be readily soldered to the commutator tangs. This however places a limitation on the application of the commutator. It could not be easily used when high temperature winding wire is to be used.

This invention aims to provide a commutator design which allows the use of a low cost assembled commutator with high temperature wire welded to the tangs without any danger of damage to the commutator base.

SUMMARY OF THE INVENTION

A first aspect of the invention provides an assembled commutator for an electric motor, comprising a base and a commutator segment mounted on the base, the commutator segment having a brush contacting portion for making electrical contact with a brush (not shown in the drawings) of a said electric motor, and a tang for electrical connection to a wire of an armature coil of a said electric motor, wherein the tang comprises a first portion extending away from the base and a second portion connected to said first portion about a fold line, whereby said first and second portions may be pressed together and heated independently of said base to forge or weld a wire therebetween.

Preferably the first and second portions lie generally in planes extending in the axial direction of the commutator.

Very preferably an edge of the tang portion extending from a brush contacting surface of the commutator segment to the fold line and facing in the direction of the brush contacting surface is sloped, so that the wire when drawn around the sloping edge will slide up into the fold.

The tang may be arranged with the first portion extending radially out from the brush contacting surface to the fold line, and the second portion forming an acute angle with the first portion so that the two portions can be clamped together between an anvil and a welding probe or the like brought towards each other to clamp the first and second portions therebetween.

Another aspect of the invention provides a method of manufacturing a rotor assembly in an electric motor, the rotor assembly comprising a shaft and an armature and an assembled commutator mounted on a shaft for rotation therewith, the armature having a coil of electrically conducting wire thereon, the commutator comprising a base and a commutator segment mounted on the base for contact with a brush of the motor, the commutator segment having a brush contacting portion and a tang extending away from the base for electrical connection with wire of the coil, wherein a fold is provided in the tang to form first and second tang portions at an acute angle to each other, the wire is passed into the fold of the tang, and the first and second tang portions are urged together and heated to forge or weld the wire to the tang.

The armature coil may be wound with the rotor assembly held in a jig, the wire being looped past the tang to engage it in the fold, the rotor may then be rotated about its axis so that the first portion of the tang rests on an anvil and a probe is then brought down to urge the second portion against the first portion to forge or weld the wire to the tang.

In another embodiment the anvil and probe are both moved inwards, from opposite sides of the tang.

Other preferred features and advantages will be apparent from the following description and the accompanying claims.

DESCRIPTION OF THE PREFERRED EMBODIMENT

Figure 1:
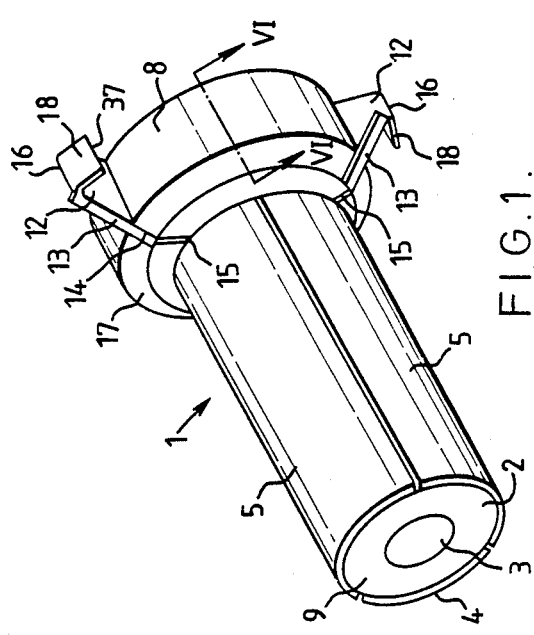
FIG. 1 is a perspective view of an assembled commutator according to the invention.

In FIG. 1 an assembled commutator 1 for a fractional horsepower PMDC motor comprises a base 2 moulded from thermoplastics material and having a through hole 3 for mounting the base 2 on a motor shaft. Three copper commutator segments 4 are mounted on the base 2.

Figure 2:
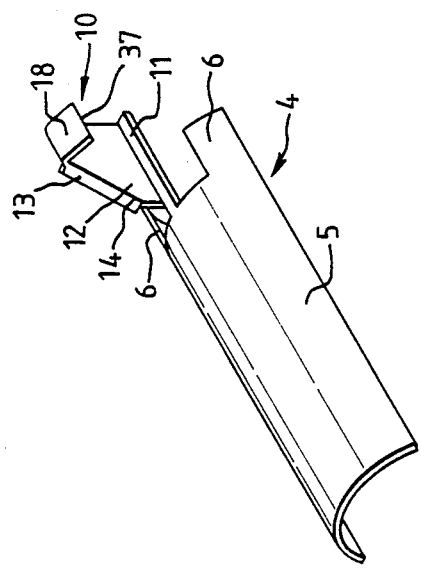
FIG. 2 is a perspective view of a commutator segment of the commutator of FIG. 1.
Figure 6:
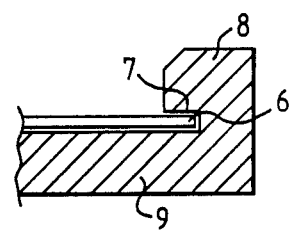
FIG. 6 is a cross-section along the line VI—VI of FIG. 1.

A segment 4 is illustrated in FIG. 2. The segment comprises a brush contacting portion 5 which fits snugly against the surface of a cylindrical support portion 9 of base 2, and two rearwardly projecting tabs 6 which are received in a blind circumferential recess 7 formed at the junction between a collar 8 and cylindrical support portion 9 of the base 2 (FIG. 6).

A tang 10 is formed between the tabs 6, and is for connection of a wire of an armature to the segment 4. Tang 10 is integral with the brush contacting portion 5 and is formed on a rearwardly extending arm 11. An upwardly extending first tang portion 12 projects radially of the assembled commutator 1 (FIG. 1), a second tang portion 18 is formed at an acute angle to the first portion 12 at a fold 16 and a flange 13 is formed on a sloping edge 14 of the first tang portion 12 facing in the direction of the brush contacting portion 5.

A slot 15 is formed in the collar 8 down to the level of the cylindrical support portion 9 of the base 2. At the base of the slot 15 the recess 7 is extended rearwardly to the back of the collar 8 to accommodate the arm 11.

The commutator segments 4 are assembled on the base 2 by sliding them axially along the supporting portion to engage the first tang portion 12 in the slot 15 and the tabs 6 and arm 11 in the circumferential recess 7. A washer 30 (FIG. 3) is then slid over brush contacting portions 5 to hold the segments 4 in position. Flange 13 rests against a chamfer 17 formed on the collar 8.

Figure 7:
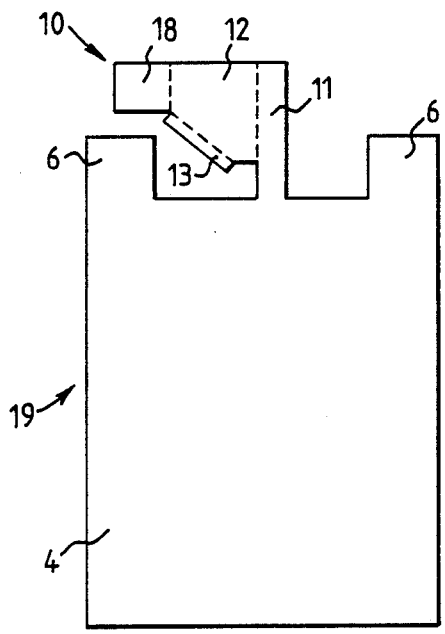
FIG. 7 shows a blank for a commutator element.

The commutator segment 5 is shaped so that it can be stamped and formed from a flat sheet of copper as illustrated in FIG. 7. The tang 10 is formed by bending the blank 19, at the dotted lines shown in FIG. 7. The brush contacting area 5 is then formed by curving the blank prior to mounting the formed segment 4 on the commutator base 2.

Figure 3:
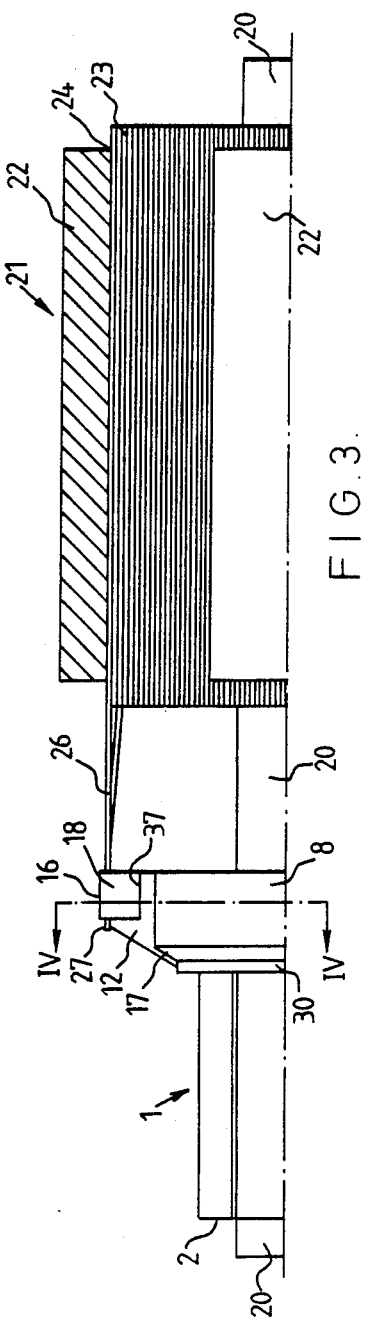
FIG. 3 is a side view of a rotor assembly incorporating the commutator of FIG. 1.
Figure 4:
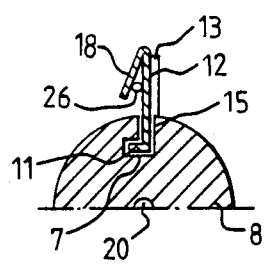
FIG. 4 is a section along line IV—IV of FIG. 3.

FIG. 3 shows a schematic side view shown partially in cross-section of a rotor assembly comprising a motor shaft 20 carrying the assembled commutator 1 and an armature 21.

The base 2 of the commutator is mounted fast on the shaft 20. The armature is mounted fast on the shaft 20 and comprises a number of mushroom-shaped cross-section arms 22, which extend radially of the shaft and each have a coil 23 wound about their stem 24.

A wire 26 of the coil 23 is looped 27 around the tang 10 of a respective commutator segment, passing between the lower edge 37 of the tang portion 18 and the collar 8, before passing on to an adjacent arm of the armature to form a coil therearound. At the end of a winding operation the wire may be looped twice around a tang 10 to tie off the end of the wire. As the wire is wound it is held under tension, this will cause the wire to slide up the sloping flange 13 of the tang 10 to rest in the inside of the fold 16.

Flange 13 provides a wide bearing surface for the wire, to prevent it being severed on the otherwise sharp edge of tang portion 12.

After the winding operation the tang portions 12, 18 are urged together under pressure and electrically heated to grip the wire loop 27 and forge or weld the wire to the tang.

Figure 5A:
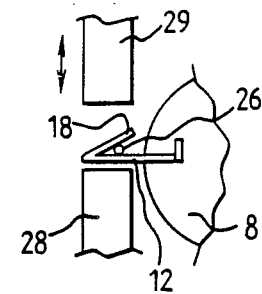
FIGS. 5a and 5b illustrate ways of welding a wire to a commutator element tang.

FIG. 5a shows schematically a first way of clamping the tang portions to weld the wire thereto. The rotor assembly is mounted in a jig, it may be the original winding jig, and twisted to lay the first tang portion 12 on anvil 28. A probe 29 is then brought down on to the tang portion 18 to press it against portion 12, clamping the wire 26 therebetween. Current may be passed between the probe 29 and anvil 28 to heat the tang and weld the wire thereto. It can be seen that no heat or pressure is applied directly to the commutator base 2.

Figure 5B:
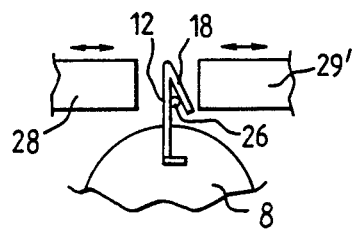

In another method, FIG. 5b, the anvil 28 and probe 29' are brought together at the sides of the tang 10 to clamp the tang before electrically heating it to weld the wire 26 thereto.

The rotor assembly described and its method of manufacture are generally well known in the art and embodied, for example, in the applicants small electric motor marketed under the catalogue number HC213. The modification provided by the invention resides in the construction of the tang 12 in an assembled commutator and the method of welding the wire thereto to avoid pressure on the commutator base.

Figure 8:
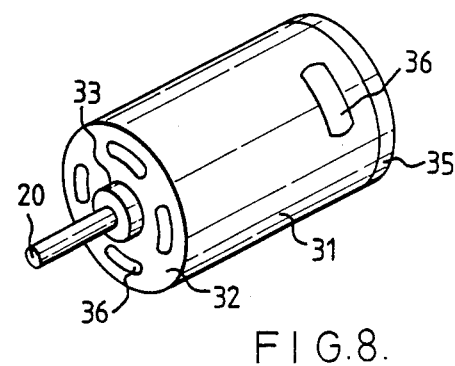
FIG. 8 shows an electric motor.

The rotor assembly as illustrated in FIG. 3 may be incorporated in an electric motor, such as a fractional horsepower permanent magnet direct current motor using a brush gear and a stator and bearing assembly. Applicants' motor number is shown in outline in FIG. 8 which shows an outer steel casing 31 having a closed end 32 supporting a bearing assembly 33 for shaft 20, and an open end which is closed by a plastics cap 35 which supports brush gear for supplying current to the coils of the armature 21 via the commutator 1, and a second bearing for shaft 20. Apertures 36 are formed in the casing for cooling as is generally known in the art.

Various modifications may be made and it is desired to include all such modifications as fall within the scope of the accompanying claims.

What is claimed is:

1. An assembled commutator for an electric motor, comprising a base and a commutator segment mounted on the base, the commutator segment having a brush contacting portion adapted to make an electrical contact with a brush of said electric motor, and a tang for electrical connection to a wire of an armature coil of said electric motor, wherein the tang comprises a first portion extending in a first direction away from the base and a second portion connected to said first portion about a fold line distal of the base, the fold line extending in a plane containing said base and the first and second portions containing an acute angle, a collar being provided on said base and defining a slot, an inner end of said first portion being received in said slot, an edge of said first portion on the side of said brush contacting portion being sloped to guide wire into the old formed between the first and second tang portions, and a flange being formed at said sloped edge.

2. An assembled commutator as claimed in claim 1, wherein said flange is supported by the collar.

3. An assembled commutator as claimed in claim 2, wherein an arm extends from an end of the brush contating portion in a plane thereof, and said tang extends from said arm.

4. An assembled commutator for an electric motor, comprising a cylindrical base of electrically insulating material, said base having a through bore for mounting the base on a shaft of said motor for rotation about a longitudinal axis of said shaft, a plurality of electrically conducting commutator segments mounted on the base, each segment having a brush contacting portion and a tang on an axial end of said brush contacting portion, said brush contacting portion laying on a cylindrical outer surface of the base and said tang extending radially away from the base in a plane containing the longitudinal axis, wherein the tang is folded about a fold line distal of the base, the fold line being generally parallel to the longitudinal axis, and tang portions on either side of the fold line being at an acute angle to one another, a first portion of said tang between said base and said fold line having an edge which slopes away from said brush contacting portion, said edge being at an obtuse angle with the brush contacting portion, and a flange being provided on said edge, said flange extending transverse to the plane of the first tang portion.

5. An assembled commutator as claimed in claim 4, wherein a flange is provided on said edge, said flange extending transverse to the plane of the first tang portion.

6. An assembled commutator as claimed in claim 4, wherein a collar is provided on the base and a radially inner end of the first tang portion is received in the collar, a radially inner end of the flange being supported by the collar.

7. An assembled commutator as claimed in claim 6, wherein an arm extends from said end of said brush contacting portion in a plane thereof, and said first tang portion is contiguous with said arm and extends radially outwards from the arm, the arm being received a slot in said collar to prevent radially outward movement of the tang.

8. In a fractional horsepower permanent magnet direct current motor, the improvement comprising an assembled commutator mounted on a shaft of the motor, the commutator comprising an electrically insulating cylindrical base having a cylindrical outer surface and a collar at one thereof, the collar having a first, radially extending slot therein, a laterally extending second slot being formed at a radially inner end of said first slot, and a commutator segment mounted on the base, the segment having a brush contacting portion supported by the cylindrical outer surface, an arm extending from an end of said brush contacting portion into said second slot, and a tang extending radially outwardly from said arm, said tang having a radially inner end received in said first slot, and being folded at a radially outer end about a fold line to form an acute angle, the fold line extending generally parallel to the shaft, a wire of a wound armature of the motor being located in the fold and secured to the tang.

9. A motor as claimed in claim 8, wherein a laterally extending flange is formed on an edge of said tang extending from said fold line towards the arm, said edge being proximal of said brush contacting portion and sloping at an obtuse angle with respect to said brush contacting portion generally in planes extending in an axial direction of the shaft.

10. A motor as claimed in claim 8, wherein the tang portion has an edge extending between the fold and the brush contacting portion, the edge being sloped to guide the wire into the fold.

* * * * *